US008280796B2

United States Patent
Henning

(10) Patent No.: US 8,280,796 B2
(45) Date of Patent: Oct. 2, 2012

(54) METHOD FOR AGGREGATING AND VALUING INTELLECTUAL PROPERTY IN AN EXCHANGE

(75) Inventor: Steven Henning, Stamford, CT (US)

(73) Assignee: MP&S Intellectual Property Associates, LLC, New York, NY (US)

( * ) Notice: Subject to any disclaimer, the term of this patent is extended or adjusted under 35 U.S.C. 154(b) by 1119 days.

(21) Appl. No.: 12/128,232

(22) Filed: May 28, 2008

(65) Prior Publication Data

US 2011/0029451 A1 Feb. 3, 2011

(51) Int. Cl.
G06Q 40/00 (2012.01)

(52) U.S. Cl. ......... 705/36 R; 705/4; 705/26.41; 705/30; 705/35; 705/36 T; 705/37; 705/38; 705/50; 705/59; 705/310; 705/500

(58) Field of Classification Search .................. None
See application file for complete search history.

(56) References Cited

U.S. PATENT DOCUMENTS

| | | | |
|---|---|---|---|
| 5,802,497 A * | 9/1998 | Manasse ........................ 705/51 |
| 5,999,907 A * | 12/1999 | Donner ........................ 705/310 |
| 6,018,714 A * | 1/2000 | Risen et al. ........................ 705/4 |
| 6,859,792 B1 | 2/2005 | Marjadi et al. |
| 6,959,289 B1 * | 10/2005 | James et al. ..................... 705/51 |
| 7,127,405 B1 * | 10/2006 | Frank et al. ................... 705/310 |
| 7,216,100 B2 | 5/2007 | Elliott |
| 7,228,288 B2 | 6/2007 | Elliott |
| 7,269,566 B2 | 9/2007 | Elliott |
| 7,272,572 B1 * | 9/2007 | Pienkos ........................ 705/26.1 |
| 7,315,836 B1 | 1/2008 | Elliott |
| 7,319,984 B2 | 1/2008 | Frankel et al. |
| 7,346,518 B1 * | 3/2008 | Frank et al. ................... 705/310 |
| 7,657,476 B2 * | 2/2010 | Barney ........................ 705/35 |
| 7,720,740 B2 * | 5/2010 | Jones ........................ 705/36 R |
| 2001/0034695 A1 * | 10/2001 | Wilkinson ..................... 705/37 |
| 2002/0002524 A1 | 1/2002 | Kossovsky et al. |
| 2002/0004775 A1 * | 1/2002 | Kossovsky et al. ............. 705/37 |
| 2002/0103654 A1 * | 8/2002 | Poltorak ........................ 705/1 |
| 2003/0061064 A1 * | 3/2003 | Elliott ........................ 705/1 |
| 2003/0196109 A1 * | 10/2003 | Raley et al. ..................... 713/200 |
| 2005/0108118 A1 * | 5/2005 | Malackowski et al. ......... 705/30 |
| 2005/0149420 A1 * | 7/2005 | Hagelin ........................ 705/35 |
| 2006/0100948 A1 * | 5/2006 | Millien et al. ................... 705/35 |
| 2006/0155572 A1 * | 7/2006 | Postrel ........................ 705/1 |

(Continued)

FOREIGN PATENT DOCUMENTS

WO  WO 2005050512   * 10/2003 ........................ 17/60

OTHER PUBLICATIONS

Malackowski, et al. The Intellectual Property Marketplace: Emerging Transaction and Investment Vehicles—Prior Art Detail. The Licensing Journal. vol. 27, No. 2. Feb. 2007.*

(Continued)

*Primary Examiner* — Robert Niquette
(74) *Attorney, Agent, or Firm* — Reed Smith, LLP

(57) ABSTRACT

The present invention relates to methods of aggregating and valuing intellectual property in a financial exchange. The present invention provides means whereby holders of intellectual property rights may sell, or license intellectual property to an aggregator and receive shares of stock or cash for the contribution based on the aggregated value of the intellectual property held by the aggregator.

9 Claims, 4 Drawing Sheets

U.S. PATENT DOCUMENTS

| | | | | |
|---|---|---|---|---|
| 2006/0259315 | A1* | 11/2006 | Malackowski et al. | 705/1 |
| 2007/0061249 | A1* | 3/2007 | Newman | 705/37 |
| 2007/0073625 | A1* | 3/2007 | Shelton | 705/59 |
| 2007/0299683 | A1* | 12/2007 | Elliott | 705/1 |
| 2008/0147541 | A1* | 6/2008 | Jones | 705/39 |
| 2008/0270152 | A1* | 10/2008 | Menezes | 705/1 |
| 2009/0030713 | A1* | 1/2009 | Venkatachalam | 705/1 |
| 2009/0150280 | A1* | 6/2009 | Malackowski et al. | 705/37 |
| 2009/0171858 | A1* | 7/2009 | Kwitek | 705/36 R |
| 2009/0234781 | A1* | 9/2009 | Malackowski et al. | 705/500 |
| 2009/0259506 | A1* | 10/2009 | Barney | 705/7 |

OTHER PUBLICATIONS

Pitkethly, Robert. The Valuation of Patents: Review of Patent Valuation Methods with Consideration of Option-based Methods. Said Business School. Unversity of Oxford. ©1997.*

Martin, Daryl et al. Method for Aggregating and Valuing Intellectual Property in an Exchange. The Licensing Journal. Oct. 2006.*

Pitkethly, Robert. The Valuation of Patents: A Review of Patent Valuation Methods with Consideration of Option-Based Methods and the Potential for Further Research. The Said Business School, Oxford Intellectual Property Research Centre St. Peter's College, Oxford OX1 2DL. ©1997.*

International Search Report and Written Opinion dated Sep. 2, 2008.

"Anatomy of a Trade" Nasdaq. The Nasdaq Stock Market, Inc. Copyright 2006 (1 page).

Listing Standards & Fees, Dec. 2007 Nasdaq (29 pages).

www.yet2.com/app/about/home (3 pages).

www.techex.com, Utek TechEx The source for New Technology (2 pages).

www.ipxi.com, Intellectual Property Exchange International dated Jan. 30, 2008 (4 pages).

Techquityventures.com, Tech Unity Investing in Innovation (1 page).

* cited by examiner

METHOD FOR AGGREGATING AND VALUING INTELLECTUAL PROPERTY IN AN EXCHANGE

THE FIELD OF THE INVENTION

The present invention relates to methods for creating a type of financial exchange that trades in intellectual property rights from a pool of intellectual property rights and in equity interest in the exchange wherein the value of each intellectual property right is based on an aggregated value of the pooled intellectual property and the value of an equity interest has a value based at least in part on the aggregated value.

BACKGROUND OF THE INVENTION

The role of intellectual property in the global economy has grown significantly over the past decades. For many of America's most prominent companies intellectual property value represents more than 70% of the market value of the individual companies. In spite of the economic importance of intellectual property, a true intellectual property-based economy has yet to develop. One factor that has stymied the development of such an economy is the contextual value of the intellectual property. The value of a given intellectual property right will vary as a function of the value perceived by the acquirer of the intellectual property right. For example, in a given transaction type, the value of intellectual property transferred will change as the needs and intended use of the acquirer change. The value of the intellectual property transferred may also change as profit margins achievable through the application of the intellectual property change.

While many attempts have been made to create generic processes for intellectual property transactions none of these attempts answers the contextual value problem. For example, companies have been formed that acquire the intellectual property rights from individual intellectual property rights holders. These companies then license or sell bundles of intellectual property rights to licensees or purchasers. Typically the original intellectual property right holder enters into such a transaction because of a financial need and the value paid to the original intellectual property right holder tends to be minimized. One reason for such a minimization is that the original intellectual property right holder does not have a wide range of access to the intellectual property market. This limited access results in a limited number of buyers for the intellectual property right. Therefore, with a limited number of buyers the intellectual property right never realizes its full and true market value in such a transaction. On the other hand, the company acquiring such individual intellectual property rights typically has a wide range of access to the markets. And so for the company, the value of the intellectual property right tends to be maximized. This wide discrepancy in values for a single intellectual property is due to the different context in which the intellectual property right was transferred.

One consequence of such discrepancies in value is a minimization of incentives to innovate. Smaller companies and independent innovators may find it difficult to balance innovation costs against the value of intellectual property if their market access is constrained.

Therefore, what is needed is a process for transacting intellectual property rights which seeks to maximize the incentives for innovation and which also mitigates the wide range and differences in economic valuation for a single intellectual property right.

What is also needed is a method for aggregating intellectual property rights from a plurality of intellectual property rights holders and providing a value to the intellectual property rights holders that is based on the aggregate value.

What is further needed is a method for valuing intellectual property that mitigates the wide range in economic valuation for intellectual property realized using present methods and adds value to the intellectual property.

SUMMARY OF THE INVENTION

The present invention provides a computer implemented method which promotes open source collaboration and seeks to maximize innovation while minimizing differences in economic value caused by the context in which an intellectual property right is transferred.

In one embodiment the method of the present invention provides the means for operating an exchange based on rights in intellectual property. In the method of the present invention an exchange is created by an aggregator of intellectual property rights that obtains rights in intellectual property from a plurality of intellectual property rights holders. The aggregator obtains such intellectual property rights either through a license or an acquisition from the original intellectual property rights holders. The rights to the aggregated intellectual property are then vested in the exchange. The value of the intellectual property rights is not determined only on a per right basis but rather the aggregated intellectual property rights are valued. In one embodiment the present invention provides a method of combining an estimate of the value of the intellectual property rights with an assessment of the impact of the intellectual property rights held by the exchange on the aggregated value of the intellectual property.

In some embodiments, the present invention provides a method for creating a publicly traded security in an intellectual property aggregator that operates an intellectual property exchange, the method comprising:
  transferring-in a plurality of intellectual property rights from a plurality of intellectual property rights holders to the intellectual property aggregator;
  calculating an aggregated intellectual property value for the plurality of transferred intellectual property rights;
  estimating an exchange intellectual property value for each of the plurality of intellectual property rights, the exchange intellectual property value being estimated by apportioning the aggregated intellectual property value among each of the plurality of intellectual property rights;
  transferring-out a portion of the plurality of intellectual property rights to one or more acquirers of intellectual property rights;
  receiving from each acquirer of intellectual property rights a payment, the payment equal to the exchange intellectual property value for each of the intellectual property rights transferred out to each acquirer;
  calculating an updated aggregated intellectual property value to account for each payment received; and
  issuing a plurality of security interests, each security interest being purchasable for a price, the price being representative of the updated aggregated intellectual property value.

In some embodiments, the present invention provides a method for operating an exchange based on rights in intellectual property implemented by a computer based system, comprising the steps of:
  aggregating a plurality of intellectual property rights from a plurality of intellectual property rights holders in an intellectual property aggregator by transferring in a first transfer the intellectual property rights to the intellectual property aggregator;

storing in a first database a first set of information describing each of the plurality of intellectual property rights holders;

storing in a second database a second set of information describing each of the plurality of intellectual property rights, the second set of information comprising a intellectual property value for each of the plurality of intellectual property rights;

storing on a third database a third set information describing a plurality of acquirers of a portion of the plurality intellectual property rights, the third set of information comprising payment information for each acquirer for each payment made to the intellectual property aggregator for a second transfer of the intellectual property rights to the acquirer;

storing on a fourth database a fourth set of information describing a plurality of investors, each investor being a purchaser of a equity interest in the intellectual property aggregator, the fourth set of information comprising investor information for each investor for investments made to the intellectual property aggregator;

inputting into a valuation module information selected from the group consisting of: the first set of information, the second set of information, the third set of information and the fourth set of information;

calculating a value of the aggregated intellectual property rights in the valuation module to account for the information;

estimating an exchange intellectual property value for each of the plurality of intellectual property rights, the exchange intellectual property value being estimated by apportioning the aggregated intellectual property value among each of the plurality of intellectual property rights; and calculating an updated aggregated intellectual property value to account for each payment received;

wherein the payment received for a intellectual property right equals the exchange intellectual property value for the intellectual property right.

BRIEF DESCRIPTION OF DRAWINGS AND FIGURES

Figure 1:
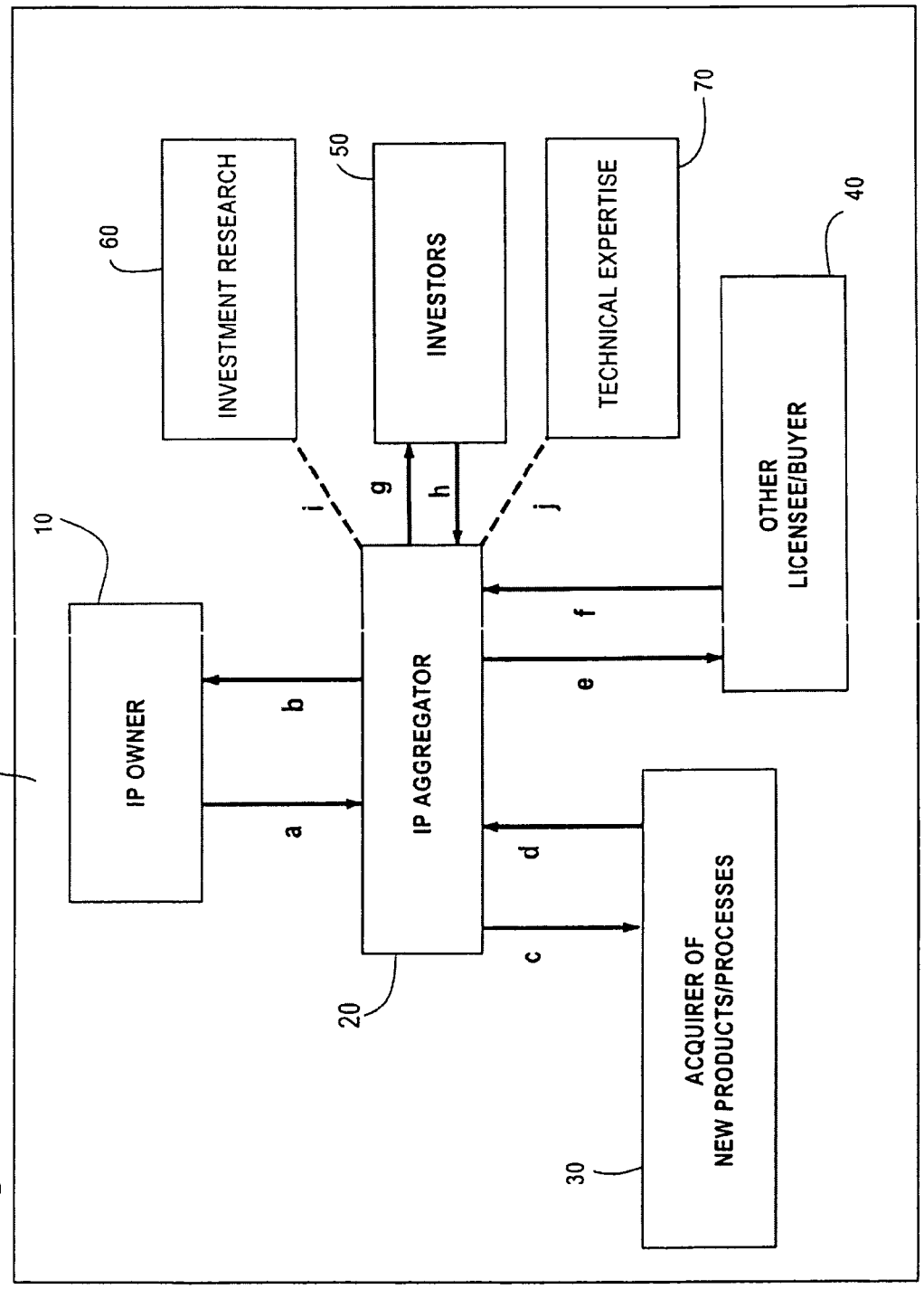
FIG. 1 is a process flow diagram illustrating an embodiment of the method of the intellectual property exchange of the present invention.
Figure 3:
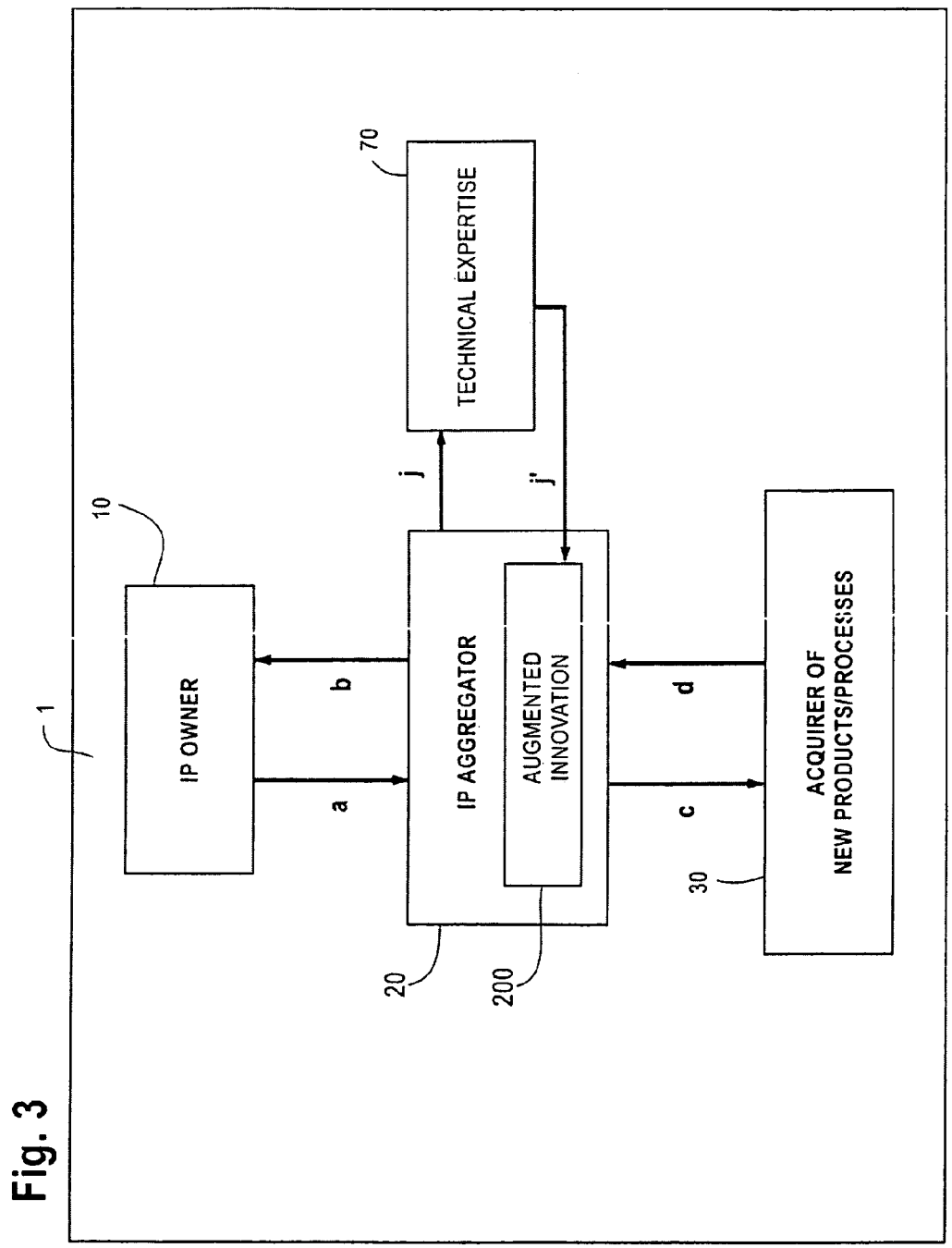
Figure 4:
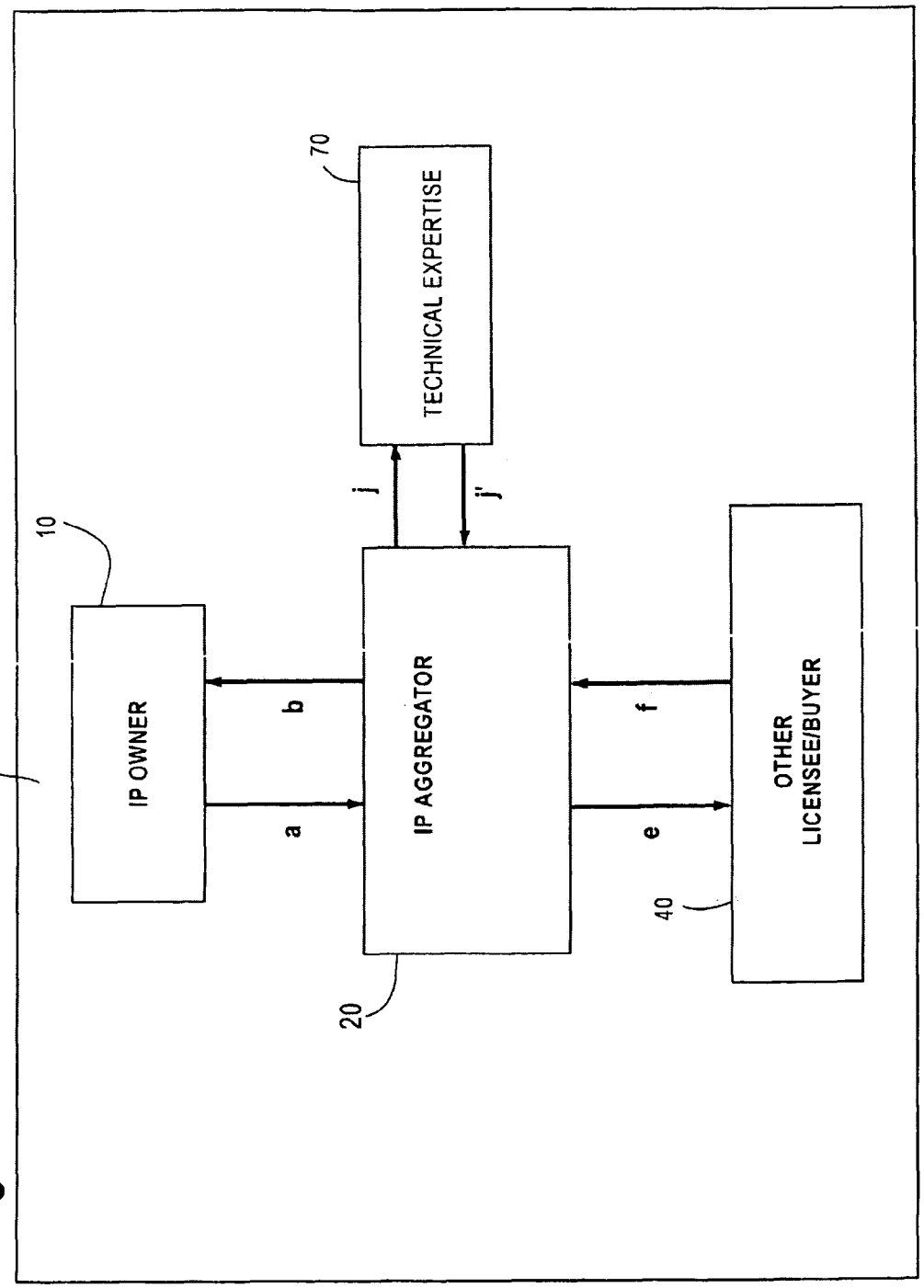

FIG. 3 is a process flow diagram illustrating an alternate embodiment of the method of the intellectual property exchange shown in FIG. 1, wherein the transferred intellectual property rights require additional research and development prior to being acceptable for transfer to the acquirer; and FIG. 4 is a process flow diagram illustrating an alternate embodiment of the method of the intellectual property exchange shown in FIG. 1, wherein the IP Aggregator identifies additional markets for existing intellectual property rights.

DETAILED DESCRIPTION OF THE INVENTION

In the method of the present invention an exchange is created by an aggregator of intellectual property that obtains rights in intellectual property from a plurality of intellectual property rights holders. The aggregator obtains such intellectual property rights either through a license or an acquisition from the original intellectual property rights holders.

An Exchange 1 according to the present invention is illustrated in FIG. 1. The Exchange 1 comprises an IP Owner 10, an IP Aggregator 20, Acquirer 30, Other Licensee/Buyer 40, Investors 50, Investment Research 60 and Technical Expertise 70. In one embodiment, the IP Aggregator 20 can be a corporation. In another embodiment, the IP Aggregator 20 can be a joint venture among investors. In yet another embodiment the IP Aggregator 20 may be a limited liability company or other legal entity such as a partnership. The Exchange 1 provides means for determining the value of an intellectual property right and transferring rights in the intellectual property from an intellectual property right holder, aggregating the transferred intellectual property rights in a central facility and further transferring portions of the aggregated intellectual property rights. Each of these elements of the Exchange 1 is described in further detail below.

In the Exchange 1, an IP Owner 10 transfers rights in an intellectual property to an IP Aggregator 20 as illustrated by flow path "a." IP Owner 10 may be a single owner of an intellectual property right or IP Owner 10 may be a plurality of owners of a plurality of intellectual property rights. The transfer of rights in an intellectual property may be by a license agreement between the IP Owner 10 and the IP Aggregator 20 or the transfer of rights may be by a sale of the rights to the IP Aggregator 20 from the IP Owner 10. Thus, flow path "a" of FIG. 1 represents the sale or license of an intellectual property right from an IP Owner 10 to an IP Aggregator 20. Flow path "a" is hereinafter referred to as "Sale/License 'a'." The license of intellectual property from an IP Owner 10 to an IP Aggregator 20 may be either an exclusive license or a non-exclusive license. In one embodiment, IP Aggregator 20 may be a plurality of IP Aggregator 20 wherein each IP Aggregator 20 obtains rights to intellectual property in different technology categories or classes. The IP Aggregator 20 is the owner of the intellectual property rights pool, the intellectual property rights pool comprising the intellectual property rights acquired by the IP Aggregator 20 from the IP Owner 10.

In yet another embodiment, each of the plurality of IP Aggregator 20 may have different investment objectives. The different investment objectives may include, for example, aggregation of a family of intellectual property rights focused on a single technology or technology area; aggregation of a family of intellectual property rights focused on a specific industry; aggregation of intellectual property rights that require further research and development effort to make the intellectual property rights viable for commercialization; or aggregation of intellectual property rights from a plurality of disciplines or technologies which when combined may create new products and/or processes.

The consideration for Sale/License "a" can include any of the well-known forms of consideration used in the sale or license of intellectual property. The IP Owner 10 may elect to receive a payment, a share or shares of stock or other equity interest in the IP Aggregator 20, or some combination of payment and shares as consideration for the license or sale of the intellectual property rights to the IP Aggregator 20. The payment may be a royalty payment or a lump-sum payment. The payment of consideration for Sale/License "a" is illustrated by flow path "b" of FIG. 1. Flow path "b" is hereinafter referred to as "Out-Payment 'b'."

The intellectual property and associated intellectual property rights of the present invention include patents, copyrights, trade secrets, know-how and confidential information. Intellectual property rights in patents, copyright and trade secrets arise under statutes enacted by the governmental body having authority over such rights. In the United States, patent rights arise under 35 U.S.C. §1 et seq. Similarly, in countries other than the United States, patent rights arise under the national laws of that country. Copyright also arises under the national laws of countries providing copyright protection. Trade secret rights in the United States arise under statutes enacted by the individual States or under the common law of States which have not enacted statutes protecting trade secret rights. In countries other than the United States, trade secret rights typically arise under the national laws of that country. Know-how and confidential information if not legally definable as trade secrets may be intellectual property rights defined and protected under contract. Accordingly, intellectual property and the associated intellectual property rights as the terms are used with respect to the present invention are as described hereinabove.

Out-Payment "b" is based on a valuation of the intellectual property right transferred in Sale/License "a." The value assigned to Out-Payment "b" is determined from a determination of the value of the intellectual property right itself ("IPV") and the value of the aggregated intellectual property rights ("AIPV"). After initialization of the Exchange 1, the value assigned to Out-Payment "b" is the exchange intellectual property right value ("EIPV"). The IPV may be determined using any of the well-known methods for valuing intellectual property rights. These well-known valuation methods include the "cost approach," the "market approach" and the "income approach."

Initialization of the Exchange 1 occurs with the first acquisition of intellectual property rights by the IP Aggregator 20 from the IP Owner 10. Upon initialization, AIPV equals IPV for the first acquired intellectual property rights minus the Out-Payment "b" made by the IP Aggregator 20 to the IP Owner 10. In the initialization of the Exchange 1, the intellectual property rights may include a single intellectual property right or a plurality of intellectual property rights.

In the "cost approach," the value of the intellectual property is set equal to the cost to reproduce or replace the intellectual property. The cost to reproduce the intellectual property is the cost to reproduce the exact same property being valued. The reproduction cost estimate may therefore include cost components which are estimates of research and development costs, estimates of costs to test and refine the intellectual property and costs to make an embodiment of the intellectual property available for commercialization. The replacement cost is an estimate of the cost to produce intellectual property having similar utility to the intellectual property being valued. The replacement cost may therefore also include cost components which are estimates of research and development costs, estimates of costs to test and refine the intellectual property and costs to make an embodiment of the intellectual property available for commercialization. Typically, under the "cost approach" the valuation measures costs as of the date of valuation and does not rely on historical cost information.

In the "market approach" the value estimate is based on the cost of similar intellectual property. The "market approach" requires the existence of a market for comparable intellectual property and knowledge of the terms of the sale or license of the comparable intellectual property.

In the "income approach" the present discounted value of a future income stream is estimated. The future income stream is typically estimated based on a number of factors including benefits of the intellectual property to alternative products or processes, the size of the market into which commercial sales based on the intellectual property will be made, manufacturing and/or supply factors relating to the commercialization, and estimated demand for the commercialized product or process.

The AIPV is estimated as the total value of the intellectual property rights held by the IP Aggregator 20. The value of the AIPV is the sum of the individual IPV for each intellectual property right held by the IP Aggregator 20 plus the value that accrues to the IP Aggregator 20 from Investors 50, Acquirer 30 and Other Licensee/Buyer 40.

Investors 50 purchase shares of stock in the IP Aggregator 20 illustrated by flow path "g" of FIG. 1 by making cash payments to the IP Aggregator 20 illustrated by flow path "h" of FIG. 1. Flow path "h" is hereinafter referred to as "Stock Payment 'h'." Flow path "g" is hereinafter referred to as "Stock Purchase 'g'."

Licensees or purchasers (individually or collectively) may acquire rights in portions of the aggregated intellectual property from the IP Aggregator 20. IP Aggregator 20 transfers rights in an intellectual property to Acquirer 30 as illustrated by flow path "c." Acquirer 30 may be a single acquirer of an intellectual property right or Acquirer 30 may be a plurality of acquirers of a plurality of intellectual property rights. The transfer of rights in an intellectual property may be by a license agreement between the IP Aggregator 20 and the Acquirer 30 or the transfer of rights may be by a sale of the rights to the Acquirer 30 from the IP Aggregator 20. Thus, flow path "c" of FIG. 1 represents the sale or license of an intellectual property right from an IP Aggregator 20 to an Acquirer 30. Flow path "c" is hereinafter referred to as "Transfer Out 'c'." Consideration for Transfer Out "c" can include any of the well-known forms of consideration used in the sale or license of intellectual property. For example, IP Aggregator 20 may elect to receive a lump-sum payment or a royalty payment for a sale or license of an intellectual property or some combination of payment types as consideration for the license or sale of the intellectual property rights to an Acquirer 30. The payment of consideration for Transfer Out "c" is illustrated by flow path "d" of FIG. 1. Flow path "d" is hereinafter referred to as "In-Payment 'd'." In-Payment "d," in one embodiment of the present invention, is a negotiated payment agreed upon by Acquirer 30 and IP Aggregator 20.

Other Licensee/Buyer 40 may acquire rights in portions of the aggregated intellectual property from the IP Aggregator 20. IP Aggregator 20 transfers rights in an intellectual property to the Other Licensee/Buyer 40 as illustrated by flow path "e." Other Licensee/Buyer 40 may be a single acquirer of an intellectual property right or Other Licensee/Buyer 40 may be a plurality of acquirers of a plurality of intellectual property rights. The transfer of rights in an intellectual property may be by a license agreement between the IP Aggregator 20 and the Other Licensee/Buyer 40 or the transfer of rights may be by a sale of the rights to the Other Licensee/Buyer 40 from the IP Aggregator 20. Thus, flow path "e" of FIG. 1 represents the sale or license of an intellectual property right from an IP Aggregator 20 to Other Licensee/Buyer 40. Flow path "e" is hereinafter referred to as "Other Transfer Out 'e'." Consideration for Other Transfer Out "e" can include any of the well-known forms of consideration used in the sale or license of intellectual property. For example, IP Aggregator 20 may elect to receive a lump-sum payment or a royalty payment for a sale or license of an intellectual property some combination of payment types as consideration for the license or sale of the intellectual property rights to the Other Licensee/Buyer 40. The payment of consideration for Other Transfer Out "e" is illustrated by flow path "f" of FIG. 1. Flow path "f" is hereinafter referred to as "Other In-Payment T." Other In-Payment "f," in one embodiment of the present invention, is a negotiated payment agreed upon by Other Licensee/Buyer 40 and IP Aggregator 20.

In some embodiments of the present invention, the AIPV may be represented by the following Formula 1:

$$\text{AIPV} = \Sigma\{\Sigma[\text{IPV}]_i + \Sigma[\text{In-Payment "}d\text{"}]_i + \Sigma[\text{Other In-Payment "}f\text{"}]_i + \Sigma[\text{Stock Payment "}h\text{"}]_i\} - \{\Sigma[\text{Out-Payment "}b\text{"}]_i\}.$$

Formula 1

The $\Sigma[\text{IPV}]_i$ represents the sum of all IPV estimated for the intellectual property held by the IP Aggregator 20. For transactions between IP Aggregator 20 and Acquirer 30, there is a cash value that accumulates with the IP Aggregator 20 from payments made by Acquirer 30 and this accumulated cash value is represented by $\Sigma[\text{In-Payment "}d\text{"}]_i$. Similarly, for transactions between IP Aggregator 20 and Other Licensee/Buyer 40 there is a cash value that accumulates with the IP Aggregator 20 from payments made by Other Licensee/Buyer 40 and this accumulated cash value is represented by $\Sigma[\text{Other In-Payment "}f\text{"}]_i$. Investors 50 who purchase stock in the IP Aggregator 20 pay a purchase price for the stock and this cash value also accumulates with the IP Aggregator 20. The sum of payments made for stock purchases is represented by $\Sigma[\text{Other In-Payment "}f\text{"}]_i$. The acquisition of intellectual property rights from IP Owner 10 by the IP Aggregator 20 requires some form of payment from the IP Aggregator 20 to the IP Owner 10. As noted above, such a payment may be in the form of cash, stock in the IP Aggregator 20, or a combination of these types of payments. The sum of all payments made by the IP Aggregator 20 to the IP Owner 10 is represented by $\Sigma[\text{Out-Payment "}b\text{"}]_i$.

In addition to the $\Sigma[\text{Out-Payment "}b\text{"}]_i$, The IP Aggregator may have additional cash outflow which may be appropriate to include in the AIPV. For example, if dividends are paid to holders of stock or other equity interest in the IP Aggregator 20, it may be appropriate to deduct the sum of dividend payments made from the AIPV. Also, it may be appropriate to deduct certain types of operating expenses, other than Out-Payment "b," from the AIPV. Formula 1 may be modified to account for such additional deductions.

In some embodiments, the AIPV is determined by a manager of the IP Aggregator 20. The manager may use any of the now known or later developed accounting and/or economics methods for valuing intellectual property. In the present invention, the AIPV is an estimate of the value of all intellectual property rights held by the IP Aggregator 20 and includes in some embodiments the effect of other value measures as described herein.

As the IP Aggregator 20 acquires additional intellectual property rights from IP Owner 10, the AIPV may be updated to account for the newly acquired IPV, payments made and received by the IP Aggregator 20 and other value measures considered by the manager of the IP Aggregator 20.

The AIPV may be represented by a stock price, the stock price being the price per share for stock in the IP Aggregator 20, but the total value of all issued stock will not necessarily equal the AIPV. The stock price may be set based on any of the well-known market processes such as an auction process or a negotiation. In one embodiment of the present invention, stock in the IP Aggregator 20 may be in the form of one or more of a well-known security or securities. As used herein, the term "stock" will refer to securities which represent an interest in the capital, assets, property or profits of the IP Aggregator 20. The types of securities may include equity securities such as common or preferred shares of stock; debt securities, which include bonds and debentures; and mutual fund investments which enable an investor to pool an investment with many other investors. The process of buying and selling of stock may include public trading of the stock. The buying and selling of stock may additionally be facilitated by any of the known or to be developed web-based methods for trading stocks also known as electronic trading. Such web-based methods would be accessible to Investors 50 via the Internet and, for example, the per share value of the stock would be posted on the electronic trading web site and Investors 50 would be provided the capability to buy shares of the stock over the Internet.

The Exchange 1 of the present invention may additionally make use of Investment Research 60 and Technical Expertise 70 as inputs into the Exchange 1. Investment Research 60, for example, may include market research for determining the IPV of an intellectual property. Investment Research 60 may also include industry research to identify IP Owner 10, Acquirer 30 or Other Licensee/Buyer 40. Investment Research 60 aids the determination of IPV and AIPV in the Exchange 1.

Technical Expertise 70, similarly aids the operation of the Exchange 1. Technical Expertise 70 may also include expertise on setting the value of stock. Technical Expertise 70 may include economic expertise on determining the AIPV. Additionally, Technical Expertise 70 may include expertise for using the intellectual property sold or licensed in Transfer Out "c" and/or Other Transfer Out "e." In one embodiment of the present invention, Technical Expertise 70 is a subsidiary company to IP Aggregator 20. Employees of Technical Expertise 70 have the requisite knowledge to make and use the subject matter of the intellectual property sold or licensed in Transfer Out "c" and/or Other Transfer Out "e." In one embodiment of the present invention, an Acquirer 30 would receive the benefit of Technical Expertise 70 in addition to rights in the sold or licensed intellectual property. In the same embodiment, or in another embodiment. Other Licensee/Buyer 40 would receive the benefit of Technical Expertise 70 in addition to rights in the sold or licensed intellectual property. The benefit received from Technical Expertise 70 can include know-how on how to make and use the subject matter, such as a product or process, of the intellectual property sold or licensed by the IP Aggregator 20.

In one embodiment, Technical Expertise 70 provides an evaluation of the intellectual property the IP Aggregator 20 has an interest in buying or licensing and based on the evaluation provides guidance to the IP Aggregator 20 on such transactions. The guidance may include direction how to pair the intellectual property the IP Aggregator 20 has an interest in buying or licensing with other intellectual property to which the IP Aggregator 20 has rights or intellectual property to which the IP Aggregator 20 should seek to acquire rights. The guidance may include direction on which intellectual property can be combined to create a portfolio of intellectual property covering new products or processes. The guidance may further include identification of areas of innovation that should be developed in order to create new intellectual property. Technical Expertise 70 may also function as a facilitator of collaborative research and development between the IP Aggregator 20 and IP Owner 10, between two or more IP Owners 10, and between one or IP Owner 10 and a third party. The collaborative research and development may include third-party sponsored research. A third party in the context of the present invention is a person or entity other than IP Aggregator 20 and IP Aggregator 10.

Technical Expertise 70 may influence the AIPV by affecting an increase in In-Payment "d" paid by Acquirer 30 for the benefit of Technical Expertise 70 in addition to rights in the sold or licensed intellectual property. Similarly, Technical Expertise 70 may cause an increase in Other In-Payment "f" paid by Other Licensee/Buyer 40 for the benefit of Technical Expertise 70 in addition to rights in the sold or licensed intellectual property. In some embodiments of the present invention, Technical Expertise 70 may generate know-how on the use or application of the sold or licensed intellectual property. In such embodiments, Acquirer 30 or Other Licensee/Buyer 40 may agree to make a higher payment when the know-how generated by Technical Expertise 70 is included in the transfer of rights. Technical Expertise 70 may also cause an increase in AIPV because of Technical Expertise 70 directed acquisition of intellectual property, combining of intellectual property into a portfolio covering new a product or process, and collaborative research and development where the result of the collaboration is new intellectual property to which the IP Aggregator holds rights.

The EIPV is determined by apportioning the AIPV among the intellectual property rights held by the IP Aggregator 20. The apportionment is based on a consideration of weighted factors, the factors in some embodiments include: scope of exclusivity of the intellectual property rights; estimated period of the exclusivity; proximity of competing intellectual property not held by the IP Aggregator 20; extent of trade secrets, know-how and/or confidential information transferred to the IP Aggregator 20 from the IP Owner 10; geographic scope of the exclusivity (e.g. extent of foreign intellectual property rights included in the intellectual property rights transferred to the IP Aggregator 20 by the IP Owner 10); relative enforceability of the intellectual property rights transferred to the IP Aggregator 20; and extent of commercial opportunities available for license or sale of the intellectual property held by the IP Aggregator to Acquirer 30 and/or Other Licensee/Buyer 40. In one embodiment, the determination of EIPV is illustrated by Formula 2.

$$\text{EIPV}i = [\text{AIPV}/\Sigma i] \times [1 + \alpha + \beta + \gamma + \delta + \epsilon + \zeta + \eta] \qquad \text{Formula 2}$$

where, $\alpha, \beta, \gamma, \epsilon, \zeta$, and $\eta$ are weighting factors representing:

- $\alpha$: scope of exclusivity of the intellectual property rights;
- $\beta$: estimated period of the exclusivity;
- $\gamma$: proximity of competing intellectual property not held by the IP Aggregator 20;
- $\delta$: extent of trade secrets, know-how and/or confidential information transferred to the IP Aggregator 20 from the IP Owner 10;
- $\epsilon$: geographic scope of the exclusivity (e.g. extent of foreign intellectual property rights included in the intellectual property rights transferred to the IP Aggregator 20 by the IP Owner 10);
- $\zeta$: relative enforceability of the intellectual property rights transferred to the IP Aggregator 20;
- $\eta$: extent of commercial opportunities available for license or sale of the intellectual property held by the IP Aggregator to Acquirer 30 and/or Other Licensee/Buyer 40; and
- $\Sigma i$ = the number of separately valued intellectual property rights held by the IP Aggregator 20.

The weighting factors may be positive or negative, such that any individual EIPV may be greater than or less than the average AIPV where $\text{AIPV}/\Sigma i$ is the average AIPV. Other weighting factors may be applied in the determination of $\text{EIPV}_i$ by, for example, the manager of the IP Aggregator 20. The weighting factors may also change over time to represent a change in weight in any one or more weighting factors due to, for example, the age of the intellectual property rights, advances in science, technology or business made relative to the intellectual property right being valued, or the acquisition of other intellectual property rights by the IP Aggregator 20 which impact the value of the intellectual property right being valued. $\text{EIPV}_i$ may alternatively be determined by now known or later developed accounting and/or economic methods for determining the value of intellectual property rights. Such other methods may include consideration of the value placed on similar intellectual property rights in transactions and/or litigation as an estimate of a value the relevant market will bear, a prospective income available from a defined transaction involving the intellectual property rights, or a negotiation with a prospective Acquirer 30 or Other Licensee/Buyer 40.

As provided herein above, initialization of the Exchange 1 occurs with the first acquisition of intellectual property rights by the IP Aggregator 20 from the IP Owner 10. Upon initialization, AIPV equals IPV for the first acquired intellectual property rights minus the Out-Payment "b" made by the IP Aggregator 20 to the IP Owner 10. The initialization values for EIPV, AIPV, IPV and Out-Payment "b" are represented by formulas 3 and 4.

$$\text{EIPV}_0 = \text{Out-Payment ``}b\text{''}_0 = \text{IPV}_0 \qquad \text{Formula 3}$$

$$\text{AIPV}_0 = \Sigma \text{EIPV}_0 \qquad \text{Formula 4}$$

In Formulae 3 and 4, the subscript 0 indicates the initialization condition. As provided herein above, in the initialization of the Exchange 1 the intellectual property rights may include a single intellectual property right or a plurality of intellectual property rights.

Each $\text{EIPV}_i$ may be re-calculated when the AIPV is updated. As provided herein above, as the IP Aggregator 20 acquires additional intellectual property rights from IP Owner 10, the AIPV may be updated to account for the newly acquired IPV, payments made and received by the IP Aggregator 20 and other value measures considered by the manager of the IP Aggregator 20. The AIPV may also be updated to account for any added value created due to Technical Expertise 70. Alternatively, each $\text{EIPV}_i$ may be re-calculated at the discretion of the manager of the IP Aggregator 20. In the preferred embodiment of the present invention, each $\text{EIPV}_i$ is re-calculated when the AIPV changes by a significant amount. The significant amount may, for example, be related to a percentage change in the AIPV. In some embodiments of the present invention, each $\text{EIPV}_i$ is re-calculated as market conditions, such as demand for intellectual property rights by Acquirer 30 or by Other Licensee/Buyer 40, change.

Figure 2:
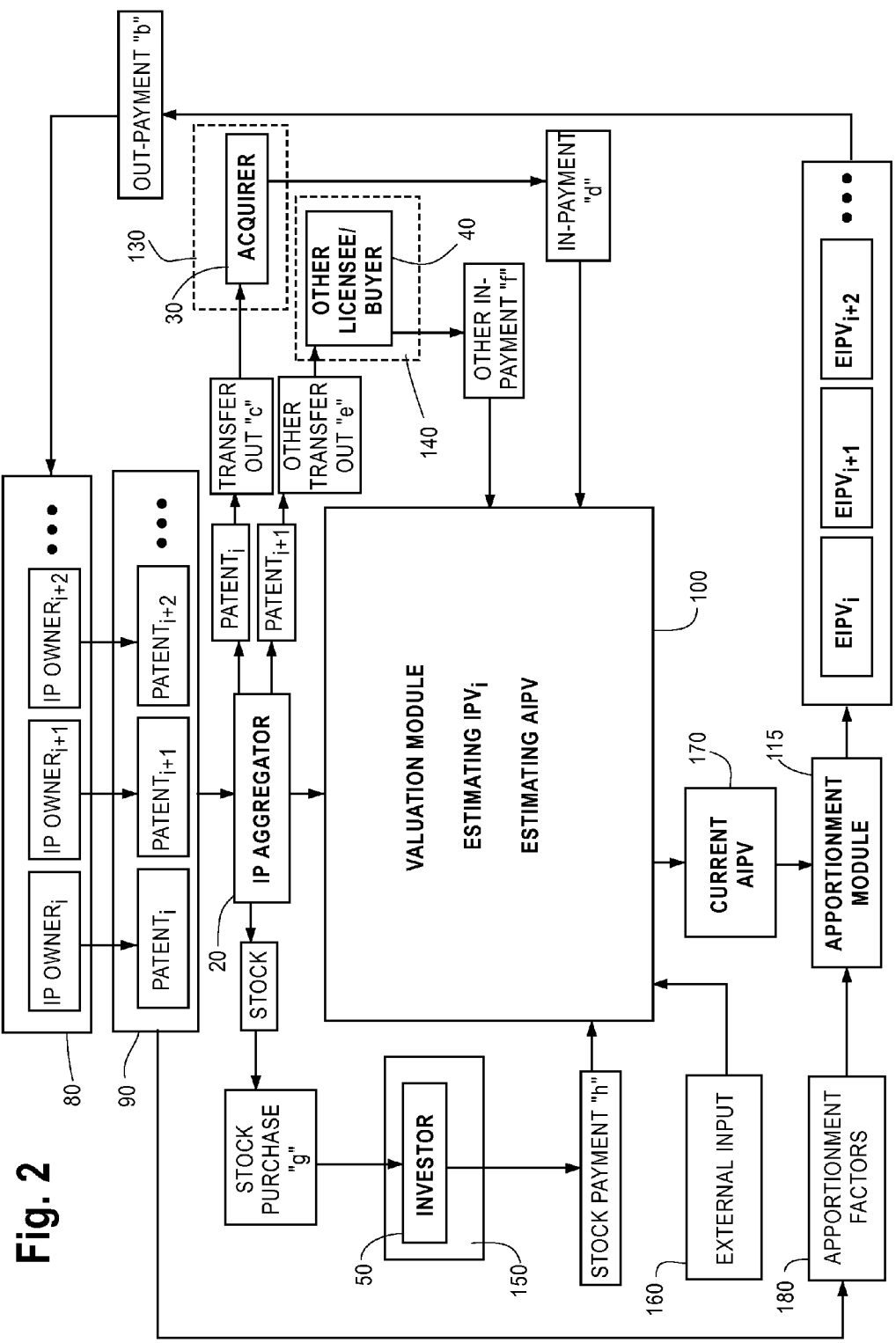
FIG. 2 is a process flow diagram illustrating an embodiment of the computer-implemented method of the intellectual property exchange of the present invention.

FIG. 2 illustrates one embodiment of the computer implemented method of the Exchange 1 of the present invention, wherein the method is performed on one or more computers or computer systems. The computer implemented method illustrated in FIG. 2 uses patents as an exemplary intellectual property right. However, the intellectual property right of the method may also include copyright, trade secrets, know-how and confidential information solely or in combination. In a database 80, data on IP Owner 10 is accumulated and maintained. The data stored in database 80 may include information on each IP Owner 10 such as address, contact information for each IP Owner 10, identification of the intellectual property of each IP Owner 10, and other information pertinent to a transactional relationship between IP Owner 10 and IP Aggregator 20. In a database 90, a description of each patent right transferred from IP Owner 10 to IP Aggregator 20 is accumulated and maintained. Each description of a patent in database 90 includes identification of the corresponding IP Owner 10, title information on the ownership of the patent, the expiration date of the patent, the existence of counterpart applications filed in the United States, the existence of foreign counterpart applications and/or patents, and indicia relating to the scope of the claims, proximity of competing intellectual property and other factors which may from time-to-time be pertinent to valuing the patent or transactions involving the patent and in some embodiments may include weighting factors as described herein above. Databases 80 and 90 are kept and maintained by the IP Aggregator 20 either directly or by contractual arrangement with a third-party provider of database services. Databases 80 and 90 may be kept and maintained as separate databases, or they may comprise different data fields in a single database.

The IP Aggregator 20, by accessing databases 80 and 90 can determine which patents to associate with a transfer of rights to an Acquirer 30 or Other Licensee/Buyer 40. Data on Acquirer 30 is kept and maintained in database 130 and such data includes name of Acquirer 30, contact information for Acquirer 30, and the patent or patents from database 90 associated with Acquirer 30. Database 130 may also include the terms of the Transfer Out "c," and the nature and value of In-Payment "d." Database 130 may further include information on the interest Acquirer 30 has in different fields of technology or business or in certain intellectual property rights. Data on Other Licensee/Buyer 40 is kept and maintained in database 140 and such data includes name of Other Licensee/Buyer 40, contact information for Other Licensee/Buyer 40, and the patent or patents from database 90 associated with Other Licensee/Buyer 40. Database 140 may also include the terms of the Transfer Out "e," and the nature and value of Other In-Payment "f." Database 140 may further include information on the interest Other Licensee/Buyer 40 has in different fields of technology or business or in certain intellectual property rights. Databases 130 and 140 are kept and maintained by the IP Aggregator 20 either directly or by contractual arrangement with a third-party provider of database services. Databases 130 and 140 may be kept and maintained as separate databases, or they may comprise different data fields in a single database. Databases 130 and 140 may also comprise different data fields in databases 80 and 90 either separately or as part of a single database combining all of the data of databases 80, 90, 130 and 140.

Database 150 contains data on Investor 50 and such data includes name of Investor 50, contact information for Investor 50, number of shares of stock or other security held by Investor 50 and the value of Stock Payment "h." Database 150 may also include such additional information relating to Stock Purchase "g" as required from time-to-time by the securities laws of the United States or the legal jurisdiction in which the IP Aggregator 20 is operating. Databases 130, 140 and 150 may also comprise different data fields in databases 80 and 90 either separately or as part of a single database combining all of the data of databases 80, 90, 130, 140 and 150. In some embodiments, the information contained within databases 80, 90, 130, 140 and 150 are different data sets stored within one or more of the computers or computer systems.

A valuation module 100 receives data from databases 80, 90, 130, 140 and 150. Included in the data is the value of Other In-Payment "f," the value of In-Payment "d," and the value of Stock Payment "h." Within valuation module 100, the individual $IPV_i$'s are determined using any of the methodologies previously described herein. Accordingly, an external input 160, comprising a database of information, provides relevant cost or market data to the valuation module 100. The database of external input 160 contains data pertinent to any one or more of the cost approach, market approach, income approach or other intellectual property valuation method known to those skilled in the art of valuing intellectual property. By way of example only, the data of external input 160 may include the cost components for calculating a reproduction or replacement cost for the patent. The data of external input 160 may also, or alternatively, include market data on the cost of comparable patents. The data of external input 160 may also, or alternatively, include estimates on future income streams and discounted cash flows.

Within valuation module 100 the AIPV is determined, in one embodiment, according to Formula 1. Other methods for calculating AIPV may be known or developed from time-to-time are within the scope of the present invention. For example, the AIPV of the present invention may be determined using data different from or in addition to In-Payment "d," Other In-Payment "f," Stock Payment "h" and Out-Payment "b." The AIPV is kept and maintained in a database associated with valuation module 100. As the variables of Formula 1, for example, change from time-to-time the AIPV for IP Aggregator 20 will be updated. Updating the AIPV may be done on a scheduled basis or as needed. The most recently updated AIPV is referred to herein as the current AIPV 170.

The current AIPV 170 is an input from the valuation module 100 into the apportionment module 115. The valuation module 100 also counts and stores the number of individual intellectual properties valued in the valuation module 100 and identified as $\Sigma i$ in Formula 2. The $\Sigma i$ is an input from the valuation module 100 into the apportionment module 115. Apportionment factors 180, in some embodiments, is a database containing the weighting factors used to adjust the average AIPV in Formula 2 and other indicia of value used by the manager of IP Aggregator 20. For patents on which database 90 includes information on the expiration date of the patent, the existence of counterpart applications filed in the United States, the existence of foreign counterpart applications and/or patents, and indicia relating to the scope of the claims, proximity of competing intellectual property and other factors which may from time-to-time be pertinent to valuing the patent or transactions involving the patent, such data is inputted from database 90 into apportionment factors 180. Additionally, apportionment factors 180 may include weighting factors not contained in database 90 such as, in the embodiment presented herein, a weighting factor representative of the extent of trade secrets, know-how and/or confidential information transferred to the IP Aggregator 20 from IP Owner 10 and a weighting factor representative of the relative enforceability of the intellectual property rights transferred to the IP Aggregator 20.

The weighting factors kept and maintained in apportionment factors 180 may be assigned as relative values on an arbitrary scale. For example, $\zeta$, a weighting factor representative of relative enforceability, may be indicated by a value from 0 to 0.1, with 0 representing a patent that has very limited enforceability and 0.1 representing a patent having the greatest level of enforceability. Similar arbitrary scales may be established for other weighting factors.

The output from the apportionment module 115 are the individual $EIPVi$'s which establish Out-payment "b" to each IP Owner 10 that transfers a patent right, by license or sale, to IP Aggregator 20.

FIG. 3 illustrates the method of the present invention in some embodiments wherein Technical Expertise 70 develops Augmented Innovation 200 which is aggregated via flow path j' by the IP Aggregator 20. In this example, the IP Aggregator 20 receives a transfer of intellectual property rights, either by sale or license, from the IP Owner 10. The transferred intellectual property rights require additional research and development effort before being acceptable for transfer to Acquirer 30. The additional research and development effort may be necessary because although the intellectual property rights transferred to the IP Aggregator 20 are suitable for application in one market, they may not be suitable for application in a market of interest to Acquirer 30. Therefore, Technical Expertise 70 receives information or data on the intellectual property rights transferred to IP Aggregator 20 along flow path j. Technical Expertise 70 then provides the additional research and development required to create Augmented Innovation 200. Augmented Innovation 200 is itself protected by intellectual property rights which are aggregated with the intellectual property rights acquired by IP Aggregator 20 form IP Owner 10 for transfer to Acquirer 30 along the flow path Transfer Out "c." IP Aggregator receives payment for Transfer Out "c" via In-Payment "d," as described herein above.

FIG. 4 illustrates the method of the present invention in some embodiments wherein Technical Expertise 70 assists IP Aggregator 20 to identify new markets for existing intellectual property rights held by IP Aggregator 20. In the example, intellectual property rights held by IP Aggregator 20 may be in use in a market "A," but could have uses in a different market "B." Technical Expertise 70 receives information or data on the intellectual property rights held by IP Aggregator 20 along flow path j, develops information or data which would allow the application of the intellectual property rights in market "B," and provides the information or data to IP Aggregator 20 along flow path j'. IP Aggregator 20 then transfers the intellectual property rights to Other Licensee/Buyer 40 via flow path Other Transfer Out "e." IP Aggregator 20 receives payment for the transferred intellectual property rights via Other In-Payment "f."

It will be appreciated by persons skilled in the art that the present invention is not limited by what has been particularly shown and described herein. Rather, the scope of the present invention is defined only by the claims which follow.

I claim:

1. A computer-implemented method for operating an exchange based on rights in intellectual property comprising the steps of:
    aggregating a plurality of intellectual property rights from a plurality of intellectual property rights holders in an intellectual property aggregator by transferring in a first transfer the intellectual property rights to the intellectual property aggregator;
    storing in a first database a first set of information describing each of the plurality of intellectual property rights holders;
    storing in a second database a second set of information describing each of the plurality of intellectual property rights, the second set of information comprising an intellectual property value for each of the plurality of the intellectual property rights;
    storing on a third database a third set of information describing a plurality of acquirers of a portion of the plurality of intellectual property rights, the third set of information comprising payment information for each acquirer for each payment made to the intellectual property aggregator for a second transfer of the intellectual property rights to the acquirer;
    storing on a fourth database a fourth set of information describing a plurality of investors, each investor being a purchaser of an equity interest in the intellectual property aggregator, the fourth set of information comprising investor information for each investor for investments made to the intellectual property aggregator;
    inputting into a valuation module information selected from the group consisting of: the first set of information, the second set of information, the third set of information and the fourth set of information;
    calculating a value of the aggregated intellectual property rights in the valuation module to account for the information;
    determining an exchange intellectual property value for each of the plurality of intellectual property rights, the exchange intellectual property value being estimated by apportioning the aggregated intellectual property value among each of the plurality of intellectual property rights;
    calculating an updated aggregated intellectual property value to account for each payment received; and
    entering a payment value in the third database for each payment received for the transfer of an intellectual property right;
    wherein the payment received for an intellectual property right equals the exchange intellectual property value for the intellectual property right.

2. A method for operating an exchange according to claim 1 wherein the first transfer of at least one of the plurality of intellectual property rights to the exchange is by sale of the intellectual property right from the intellectual property holder to the intellectual property aggregator.

3. A method for operating an exchange according to claim 2 wherein the intellectual property rights holder receives one or more shares of stock in the intellectual property aggregator for the sale.

4. A method for operating an exchange according to claim 1 wherein the first transfer of at least one of the plurality of intellectual property rights to the exchange is by a license of the intellectual property right from the intellectual property holder to the intellectual property aggregator.

5. A method for operating an exchange according to claim 4 wherein the intellectual property rights holder receives one or more shares of stock in the intellectual property aggregator for the license.

6. A method for operating an exchange according to claim 1 wherein the second transfer of an intellectual property right to an acquirer is by sale of the intellectual property right.

7. A method for operating an exchange according to claim 1 wherein the second transfer of an intellectual property right to an acquirer is by a license of the intellectual property right.

8. A method for operating an exchange according to claim 1 wherein at least one of the plurality of intellectual property rights is a patent.

9. A method for operating an exchange according to claim 1 wherein at least one of the plurality of intellectual property rights is a trade secret.

* * * * *

UNITED STATES PATENT AND TRADEMARK OFFICE
CERTIFICATE OF CORRECTION

PATENT NO. : 8,280,796 B2  Page 1 of 1
APPLICATION NO. : 12/128232
DATED : October 2, 2012
INVENTOR(S) : Steven Henning It is certified that error appears in the above-identified patent and that said Letters Patent is hereby corrected as shown below:

Column 7, Line 1 "Other In-Payment T." should be -- Other In-Payment "f". --

Column 9, Line 37 "where, $\alpha, \beta, \gamma, \varepsilon, \zeta,$ and $\eta$ "

should be -- where, $\alpha, \beta, \gamma, \delta, \varepsilon, \zeta,$ and $\eta$ --

Signed and Sealed this
Twenty-seventh Day of November, 2012

David J. Kappos
*Director of the United States Patent and Trademark Office*